United States Patent
Heo

(10) Patent No.: US 9,986,286 B2
(45) Date of Patent: May 29, 2018

(54) BROADCAST SIGNAL RECEIVING APPARATUS AND CONTROL METHOD OF THE SAME AND BROADCAST SIGNAL TRANSMITTING APPARATUS

(71) Applicant: SAMSUNG ELECTRONICS CO., LTD., Suwon-si (KR)

(72) Inventor: Jae-cheol Heo, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days. days.

(21) Appl. No.: 14/736,372

(22) Filed: Jun. 11, 2015

(65) Prior Publication Data
US 2016/0007075 A1    Jan. 7, 2016

(30) Foreign Application Priority Data
Jul. 2, 2014    (KR) .................. 10-2014-0082381

(51) Int. Cl.
*H04N 7/173*    (2011.01)
*H04N 21/438*    (2011.01)
*H04N 21/458*    (2011.01)

(52) U.S. Cl.
CPC ..... *H04N 21/4383* (2013.01); *H04N 21/4586* (2013.01)

(58) Field of Classification Search
CPC .................. H04N 21/4383; H04N 21/4586
USPC ....................................................... 725/116
See application file for complete search history.

(56) References Cited

U.S. PATENT DOCUMENTS

| | | | | |
|---|---|---|---|---|
| 7,849,490 B2 * | 12/2010 | Akhter | ............... | H04N 7/17354 348/E7.071 |
| 8,141,123 B2 * | 3/2012 | Del Sordo | ......... | H04N 21/8173 386/213 |
| 8,499,327 B2 * | 7/2013 | Derham | ............. | H04N 21/2385 725/114 |
| 8,528,013 B2 * | 9/2013 | Bradley | ................. | H04N 7/162 725/104 |
| 2008/0229379 A1 * | 9/2008 | Akhter | ............... | H04N 7/17354 725/139 |
| 2009/0025027 A1 * | 1/2009 | Craner | ................. | H04H 20/103 725/32 |
| 2009/0031341 A1 * | 1/2009 | Schlack | ............... | H04N 5/4401 725/38 |

(Continued)

*Primary Examiner* — Michael B Pierorazio
(74) *Attorney, Agent, or Firm* — Sughrue Mion, PLLC

(57) ABSTRACT

A broadcast signal receiving apparatus including: a communication interface which receives a broadcast signal of a variable channel group including at least one channel selected from among a plurality of channels optionally included in the broadcast signal; a memory which stores tuning information corresponding to the at least one channel; and a controller configured to request current tuning information corresponding to a current at least one channel of the variable channel group currently included in a current broadcast signal, wherein the stored tuning information does not correspond to the current at least one channel, receive the current tuning information corresponding to the current at least one channel, store the received current tuning information in the memory, and receive the current broadcast signal of the current at least one channel based on the stored current tuning information in response to receiving a command to view the current at least one channel.

12 Claims, 11 Drawing Sheets

(56) References Cited

U.S. PATENT DOCUMENTS

| | | | |
|---|---|---|---|
| 2009/0133049 A1* | 5/2009 | Bradley | H04N 7/162 725/28 |
| 2009/0158380 A1* | 6/2009 | Derham | H04N 21/2385 725/131 |
| 2011/0099595 A1* | 4/2011 | Lindquist | H04N 21/4383 725/105 |
| 2011/0289536 A1* | 11/2011 | Poder | H04H 60/97 725/95 |
| 2012/0151532 A1* | 6/2012 | Del Sordo | H04N 21/4383 725/59 |
| 2012/0167128 A1* | 6/2012 | Bradley | H04N 21/25891 725/27 |

* cited by examiner

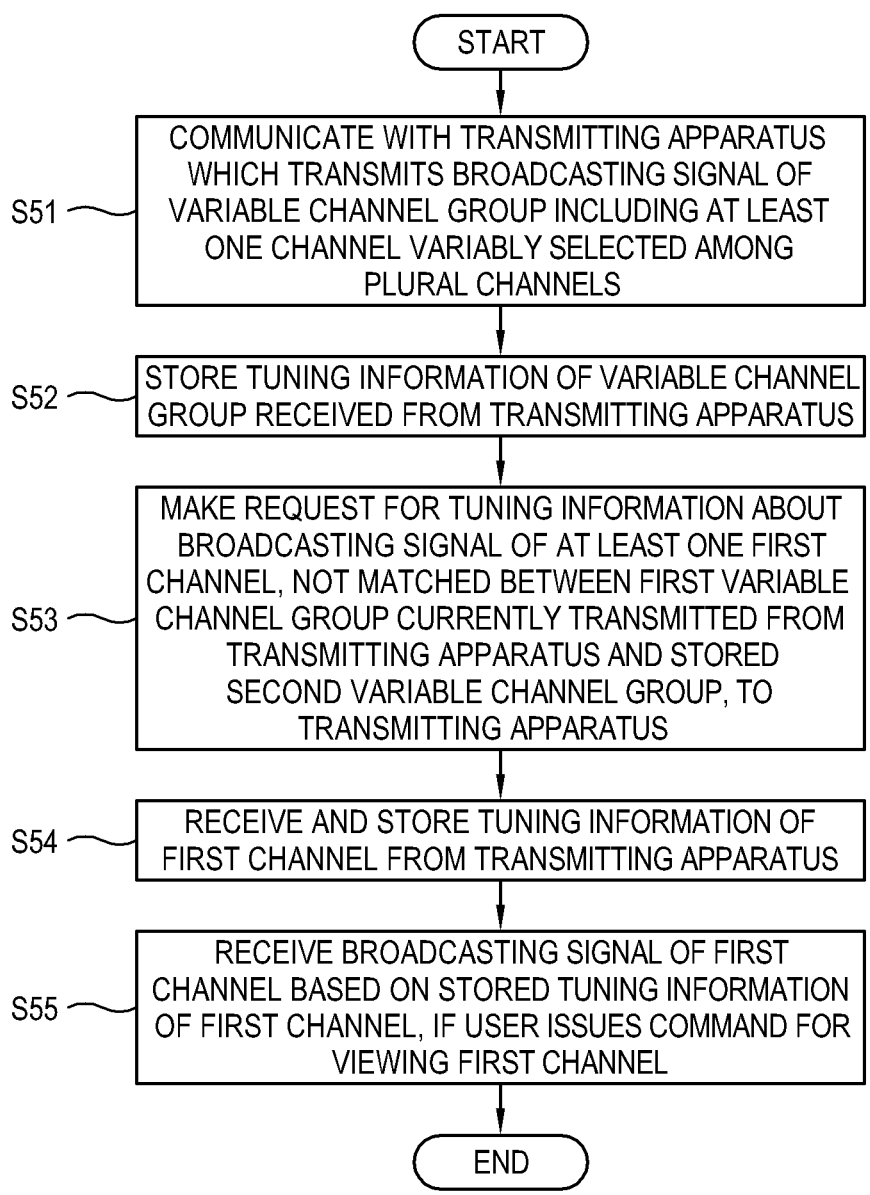

BROADCAST SIGNAL RECEIVING APPARATUS AND CONTROL METHOD OF THE SAME AND BROADCAST SIGNAL TRANSMITTING APPARATUS

CROSS-REFERENCE TO RELATED APPLICATION

This application claims priority from Korean Patent Application No. 10-2014-0082381, filed on Jul. 2, 2014, in the Korean Intellectual Property Office, the disclosure of which is incorporated herein by reference in its entirety.

BACKGROUND

1. Field

Apparatuses and methods consistent with one or more exemplary embodiments relate to a broadcast signal receiving apparatus and a control method of the same, and more particularly to a broadcast signal receiving apparatus and a control method of the same, which can easily and quickly receive a broadcast signal of a channel desired by a user when a broadcast signal transmitting apparatus provides broadcast signals of a variable channel group variably selected among a plurality of channels.

2. Description of the Related Art

A broadcast signal receiving apparatus refers to an apparatus that receives a broadcast image signal and processes the received image signal in accordance with various processes so that the corresponding image signal can be displayed by the apparatus or another device. The broadcast signal receiving apparatus may include a display panel like a television (TV) or a monitor for a computer, and may display the processed image signal as an image itself. Alternatively, a broadcast signal receiving apparatus, such as a set-top box, may not include a display panel and may process and output an image signal to another device. In a particular case of the TV or the set-top box, the broadcast signal receiving apparatus is tuned to a channel selected by a user and receives a broadcast signal from a transmitter of a broadcaster through the tuned channel, thereby processing the broadcast signal to be displayed as an image.

The broadcast signal receiving apparatus stores a channel map including tuning information for the broadcast signal based on system or service information (SI) provided by the broadcaster. The tuning information includes various pieces of information such as a frequency, a symbol rate, etc. to specify a channel in the broadcast signal transmitted from the transmitter.

For example, the broadcast signal includes broadcasting data of channels in different frequency bands, and thus a frequency of a predetermined channel has to be known in order to extract a broadcast image of a corresponding channel from the broadcast signal. If a user selects a channel, an image receiving apparatus is tuned to the selected channel of the broadcast signal based on information about a channel map.

In a case where a broadcast signal system based on a switched digital video (SDV) method is initially booted up, the broadcast signal system searches channels of the broadcast signal provided from the transmitter of the broadcaster so as to be turned to a previously-viewed channel selected by a user if the user selects the channel, and then makes a request for tuning information about the channel selected by the user to the transmitter if the transmitter does not provide a broadcast signal for the selected channel. Such procedures slow channel tuning and thus inconvenience a user.

SUMMARY

Aspects of one or more exemplary embodiments are conceived to solve the foregoing problems of a broadcast signal receiving apparatus, and one or more exemplary embodiments may provide a broadcast signal receiving apparatus and a control method of the same, which can previously grasp and update broadcast signals when a broadcast signal transmitting apparatus provides broadcast signals of a variable channel group variably selected among a plurality of channels, and more quickly display channels based on updated information when receiving a user's selection for the channel.

In accordance with an aspect of an exemplary embodiment, there is provided a broadcast signal receiving apparatus including: a communication interface configured to communicate with a transmitting apparatus to receive a broadcast signal including a variable channel group, the variable channel group including at least one channel selected from among a plurality of channels optionally included in the broadcast signal; a memory configured to store tuning information corresponding to the at least one channel of the variable channel group included in the broadcast signal; and a controller configured to control the communication interface to transmit a request for current tuning information corresponding to a current at least one channel of the variable channel group currently included in a current broadcast signal, wherein the stored tuning information does not correspond to the current at least one channel, to the transmitting apparatus, control the communication interface to receive the current tuning information corresponding to the current at least one channel, store the received current tuning information in the memory, and control the communication interface to receive the current broadcast signal of the current at least one first channel based on the stored current tuning information corresponding to the current at least one first channel in response to receiving a command to view the current at least one channel. Thus, it is advantageously possible to more quickly display a channel desired by a user since the tuning information of varied channels is updated in accordance with whether or not the variable channel group transmitted from the transmitting apparatus is varied.

The current at least one channel may include at least one of a previously-viewed channel and a lastly-viewed channel. Thus, the current tuning information is provided with regard to the channel previously viewed by a user even though the variable channel group transmitted from the transmitting apparatus is varied, so that the previously-viewed channel can be quickly tuned to and displayed when the user selects the previously-viewed channel.

The current at least one channel may include a preset favorite channel. Thus, the tuning information is provided with regard to the favorite channel frequently viewed by a user even though the variable channel group transmitted from the transmitting apparatus is varied, so that the favorite channel can be quickly tuned to and displayed when the user selects the favorite channel.

The controller may to control the communication interface to transmit a request for the current tuning information corresponding to the current broadcast signal of the current at least one first channel to the transmitting apparatus in accordance with at least one of a preset time and a preset period. Thus, the tuning information about a user's previously-viewed channel or favorite channel is provided at the preset time or in the preset period, so that channel switching can be immediately performed with less delay when the user selects the corresponding channel.

The controller may control the communication interface to transmit a request for the current tuning information corresponding to the current broadcast signal of the current at least one first channel to the transmitting apparatus while the broadcast signal receiving apparatus is in a standby mode. Thus, the tuning information is provided with regard to a user's lastly-viewed channel or favorite channel in the standby mode where the user is not viewing a channel, so that channel switching can be quickly performed when the user desires to view the corresponding channel.

The controller may control the communication interface to transmit a request for the current tuning information corresponding to the current broadcast signal of the current at least one channel to the transmitting apparatus during a normal mode of the broadcast signal receiving apparatus in which a channel is viewable. Thus, the tuning information is provided with regard to the previously-viewed channel even while a user is viewing a channel, so that channel switching can be quickly performed when the user selects the previously-viewed channel again.

The controller may control the communication interface to transmit a request for the current tuning information corresponding to the current broadcast signal of the current at least one channel to the transmitting apparatus in accordance with a connection of the broadcast signal receiving apparatus with the transmitting apparatus. Thus, even when the connection with the transmitting apparatus is stopped and then resumed, it is possible to quickly switch to a channel desired by a user.

The controller may store in the memory tuning information about a merged channel group, based on the tuning information corresponding to the broadcast signal of the variable channel group and tuning information corresponding to a broadcast signal of a basic channel group including a plurality of channels always transmitted from the transmitting apparatus. Thus, both the always-transmitted basic channel and the variable channel transmitted by a switched digital video (SDV) method are stored and managed, so that channel switching can be quickly performed without any time delay when a channel is selected.

The tuning information corresponding to the merged channel group may include an identifier for identifying the variable channel group and the basic channel group. Further, the tuning information corresponding to the merged channel group may include information indicating whether the variable channel group is transmitted. Thus, the variable channel group and the basic channel group are merged and managed, so that channel switching can be quickly performed without any additional delay when the channel switching is implemented by a user between the basic channel and the variable channel.

In accordance with another aspect of an exemplary embodiment, there is provided a method of controlling a broadcast signal receiving apparatus, the method including: communicating with a transmitting apparatus which transmits a broadcast signal including a variable channel group, the variable channel group including at least one channel selected from among a plurality of channels optionally included in the broadcast signal; storing tuning information corresponding to the at least one channel the variable channel group included in the broadcast signal; transmitting a request for current tuning information corresponding to a current at least one channel of the variable channel group currently included in a current broadcast signal, wherein the stored tuning information does not correspond to the current at least one channel, to the transmitting apparatus; receiving the current tuning information corresponding to the current at least on channel; storing the received current tuning information; and receiving the current broadcast signal of the current at least one channel based on the stored current tuning information corresponding to the current at least one channel in response to receiving a command to view the current at least one channel.

The current at least one channel may include at least one of a previously-viewed channel and a lastly-viewed channel. Further, the current at least one channel may include a preset favorite channel.

The transmitting the request for the current tuning information may include transmitting a request for the current tuning information corresponding to the current broadcast signal of the current at least one channel to the transmitting apparatus in accordance with at least one of a preset time and a preset period.

The method may further include transmitting a request for the current tuning information corresponding to the current broadcast signal of the current at least one channel to the transmitting apparatus while the broadcast signal receiving apparatus is in a standby mode.

The method may further include transmitting a request for the current tuning information corresponding to the current broadcast signal of the current at least one channel to the transmitting apparatus during a normal mode of the broadcast signal receiving apparatus in which a channel is viewable.

The method may further include transmitting a request for the current tuning information corresponding to the current broadcast signal of the current at least one channel to the transmitting apparatus in accordance with a connection of the broadcast signal receiving apparatus with the transmitting apparatus.

The method may further include storing tuning information about a merged channel group, based on the tuning information corresponding to the broadcast signal of the variable channel group and tuning information corresponding to a broadcast signal of a basic channel group including a plurality of channels always transmitted from the transmitting apparatus.

The tuning information corresponding to the merged channel group may include an identifier for identifying the variable channel group and the basic channel group. Further, the tuning information corresponding to the merged channel group may include information about whether the variable channel group is transmitted.

In accordance with still another aspect of an exemplary embodiment, there is provided a broadcast signal receiving apparatus including: a communication interface configured to communicate with a broadcast signal transmitting apparatus in order to receive a broadcast signal of a channel tuned among a plurality of channels; a memory configured to store tuning information for being tuned to the channel of the broadcast signal; and a controller configured to store the tuning information in the memory if the tuning information about at least one channel which belongs to the variable channel group variably selected among the plurality of channels is received from the transmitting apparatus, control the communication interface to receive the broadcast signal of the at least one channel which belongs to the variable channel group based on the tuning information stored in the memory in response to a user command for viewing the at least one first channel which belongs to the variable channel group, and controls the communication interface to make a request for the tuning information of the first channel which belongs to the variable channel group to the transmitting apparatus if the tuning information of the first channel which belongs to the variable channel group is not stored in the memory. Thus, it is possible to more quickly display a channel desired by a user even when variably selected channels among the plurality of channels of the broadcast signal transmitted from the broadcast signal transmitting apparatus.

The controller searches tuning information of at least one channel which belongs to the variable channel group among the tuning information stored before receiving the user command when receiving the user command for viewing the corresponding channel. It is possible to quickly search the channel from the stored tuning information without searching the channel provided from the broadcast signal transmitting apparatus The controller periodically receives and stores the tuning information about at least one channel, which belongs to the variable channel group, from the transmitting apparatus, and updates the stored tuning information with the received tuning information if the received tuning information is different from the previously stored tuning information. It is possible to quickly search the channel by continuously determining the channels of the variable channel group transmitted from the transmitting apparatus and storing the tuning information of the currently provided channels.

The controller can more quickly display a channel in response to a request of a user who desires to view the channel, based on the tuning information about the at least one channel that belongs to the variable channel group received from the transmitting apparatus.

Further, the controller scans the tuning information about a basic channel group including a plurality of channels always transmitted from the transmitting apparatus, and store the tuning information of the merged channel, based on the tuning information about the scanned basic channel group and the tuning information of the variable channel group, in the memory. Thus, it is more quickly display a channel, based on the stored tuning information of the merged channel, in response to a user's request for viewing the channel.

When a user issues a command for switching to the previously-viewed channel, if it is determined based on the stored tuning information that the previously-viewed channel is not being supplied, the controller makes a request for tuning information of the previously-viewed channel to the transmitting apparatus. It is thus possible to quickly determine whether the previously-viewed channel is supplied or not, based on the tuning information of the channel previously stored before making a request for the tuning information of the previously viewed channel.

When a user issues a command for switching to the lastly-viewed channel, if it is determined based on the stored tuning information that the lastly-viewed channel is not being supplied, the controller makes a request for the tuning information of the lastly-viewed channel to the transmitting apparatus. It is possible to quickly determine whether the lastly-viewed channel is supplied or not, based on the tuning information of the channel previously stored before making a request for the tuning information of the lastly-viewed channel.

The broadcast signal receiving apparatus may further include an image processor configured to process the received broadcast signal as an image, and the controller controls the image processor to process the received broadcast signal as an image, and transmits the processed broadcast signal to the display apparatus. It is possible to more quickly display the channel by processing the broadcast signal of the channel desired by a user as an image even when at least one channels variably selected among the plurality of channels of the broadcast signal are provided to him/her.

The broadcast signal receiving apparatus may further include a user input configured to receive a user command, wherein, if the user command including a channel changing command is received, an image of a channel corresponding to the user command is controlled to be received from the transmitting apparatus. Based on the tuning information of the channel stored in response to a user command for viewing the at least one channel, which belongs to the variable channel group, it is possible to quickly receive an image of the corresponding channel from the transmitting apparatus.

In accordance with yet another aspect of an exemplary embodiment, there is provided a method of controlling a broadcast signal receiving apparatus, the method including: receiving tuning information about at least one channel, which belongs to the variable channel group, among a plurality of channels from a transmitting apparatus; storing the received tuning information; receiving a broadcast signal of the at least one channel, which belongs to the variable channel group, based on the stored tuning information, in response to a user command for viewing the at least one channel which belongs to the variable channel group; and making a request for the tuning information of the at least one channel, which belongs to the variable channel group, to the transmitting apparatus, if the tuning information of the at least one channel which belongs to the variable channel is not stored.

The making the request for the tuning information of the first channel includes searching the tuning information of at least one channel which belongs to the variable channel group among the tuning information stored before receiving the user command when receiving the user command for viewing the at least one channel among the variable channel group.

The storing the received tuning information includes: periodically receiving and storing the tuning information about the at least one channel which belongs to the variable channel group from the transmitting apparatus; and updating the stored tuning information with the received tuning information if the received tuning information is different from the previously stored tuning information.

Here, it is possible to more quickly display a channel in response to a user's request for viewing the channel, based on the tuning information about the at least one channel which belongs to the variable channel group received from the transmitting apparatus.

The storing the received tuning information includes: scanning the tuning information about a basic channel group including a plurality of channels always transmitted from the transmitting apparatus; and storing the tuning information about the merged channel based on the tuning information about the scanned basic channel group and the tuning information about the variable channel group.

The making the request for the tuning information of the first channel includes: making a request for tuning information of the previously-viewed channel to the transmitting apparatus if it is determined based on the stored tuning information that the previously-viewed channel is not being supplied, when a user issues a command for switching to the previously-viewed channel.

The making the request for the tuning information of the first channel includes: making a request for the tuning information of the lastly-viewed channel to the transmitting apparatus if it is determined based on the stored tuning information that the lastly-viewed channel is not being supplied, when a user issues a command for switching to the lastly-viewed channel.

The method may further include processing the received broadcast signal as an image; and transmitting the processed broadcast signal to the display apparatus.

The method may further include receiving a broadcast signal of a channel corresponding to the user command if the user command for changing a channel is received.

In accordance with still another aspect of an exemplary embodiment, there is provided a broadcast signal receiving apparatus including: a transceiver configured to communicate with a broadcast signal transmitting apparatus, the broadcast signal transmitting apparatus being configured to transmit a broadcast signal including a plurality of broadcast channels, one or more broadcast channels among the plurality of broadcast channels being variably transmitted broadcast channels from among a plurality of broadcast channels of a variable channel group; a memory configured to store tuning information corresponding to the one or more broadcast channels; and a controller configured to: control the transceiver to request, from the broadcast signal transmitting apparatus, current tuning information corresponding to current one or more variably transmitted broadcast channels among the plurality of broadcast channels, update, in response to the current tuning information differing from the stored tuning information, the stored tuning information based on the current tuning information, and control the transceiver to receive a selected broadcast channel based on the updated stored information.

The controller may be further configured to control the transceiver to request the current tuning information in accordance with at least one of a preset time and a preset period.

The controller may be further configured to: determine whether the broadcast signal includes the selected broadcast channel, and control the transceiver to request, in response to determining that the broadcast signal does not include the selected broadcast channel, from the broadcast signal transmitting apparatus, tuning information corresponding to the selected broadcast channel.

In accordance with still another aspect of an exemplary embodiment, there is provided a broadcast signal transmitting apparatus including: a transceiver configured to communicate with a broadcast signal receiving apparatus, and to transmit a broadcast signal including a plurality of broadcast channels, one or more broadcast channels among the plurality of broadcast channels being a variably transmitted broadcast channel from among a plurality of broadcast channels; and a controller configured to control the transceiver to transmit, to the broadcast signal receiving apparatus, current tuning information corresponding to current one or more variably transmitted broadcast channels among the plurality of broadcast channels.

The controller may be configured to control the transceiver to transmit the current tuning information in accordance with at least one of a preset time and a preset period.

The controller may be configured to control the transceiver to transmit the current tuning information in response to receiving a request for the current tuning information from the broadcast signal receiving apparatus.

BRIEF DESCRIPTION OF THE DRAWINGS

The above and/or other aspects will become apparent and more readily appreciated from the following description of one or more exemplary embodiments, taken in conjunction with the accompanying drawings, in which:

FIG. 11 is a flowchart showing a control method of a broadcast signal receiving apparatus according to an exemplary embodiment.

DETAILED DESCRIPTION OF EXEMPLARY EMBODIMENTS

Below, exemplary embodiments will be described in detail with reference to accompanying drawings. The present disclosure may be achieved in various forms and not limited to the following exemplary embodiments. For convenience of description, parts not directly related to the present disclosure are omitted, and like numerals refer to like elements throughout.

Figure 1:
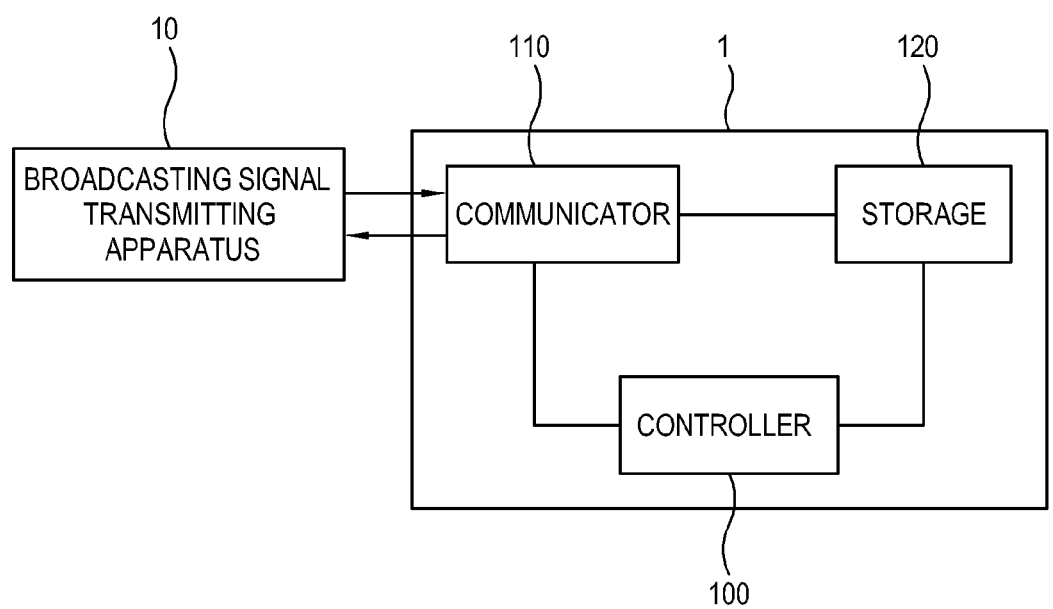
FIG. 1 is a block diagram of a broadcast signal receiving apparatus according to an exemplary embodiment.

FIG. 1 is a block diagram of a broadcast signal receiving apparatus 1 according to an exemplary embodiment. The broadcast signal receiving apparatus 1 according to an exemplary embodiment may be achieved by a set-top box, a display apparatus, a user terminal, etc. According to an exemplary embodiment, the broadcast signal receiving apparatus 1 includes a communicator 110, i.e. a communication interface or a transceiver, a storage 120, i.e. a memory, and a controller 100.

Figure 2:
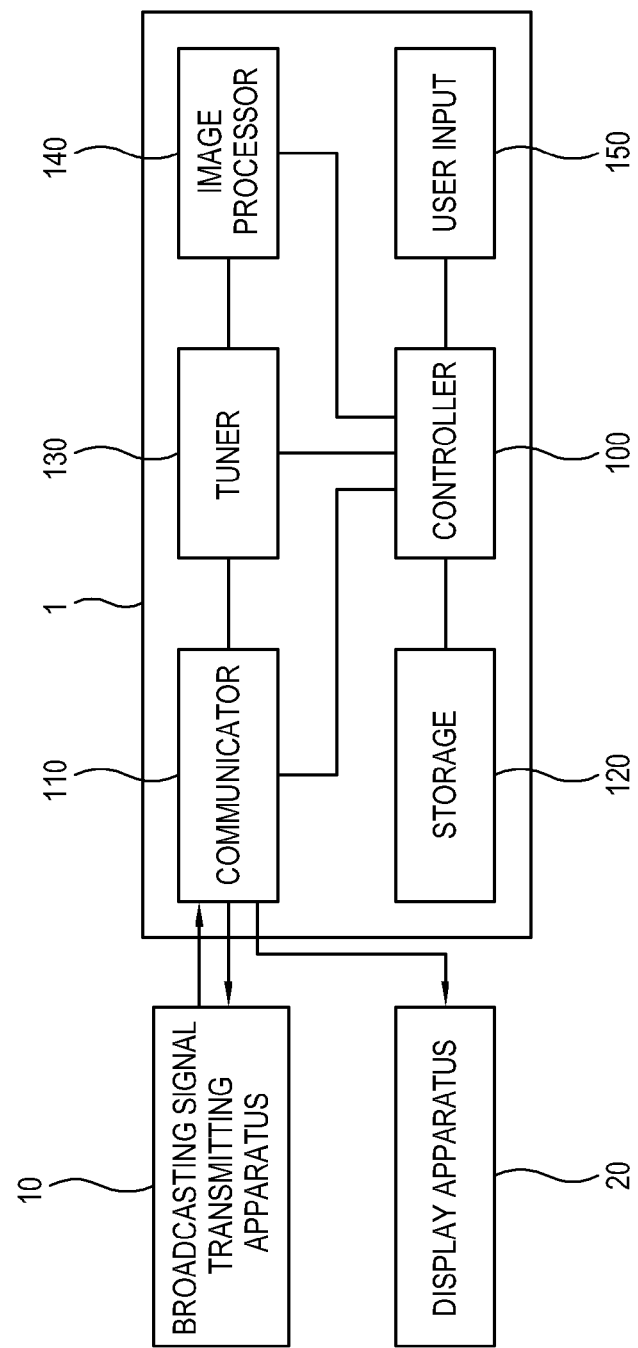
FIG. 2 is a block diagram showing an example of the broadcast signal receiving apparatus according to an exemplary embodiment.

The communicator 110 receives a signal from an external source, i.e. a broadcast signal transmitting apparatus 10, and transmits the signal to an image processor (see FIG. 2 (140)) or the controller 100. The communicator 110 connects with various external source cables to receive signals corresponding to external sources through the cables, or may receive a signal in accordance with preset wireless communication standards.

The communicator 110 may include a plurality of connectors to which cables are connected. The communicator 110 may receive a signal from the connected external source, for example, a broadcast signal, an image signal, a data signal, etc. based on high definition multimedia interface (HDMI), universal serial bus (USB), and component standards, or communication data through a communication network.

The communicator 110 may include not only a configuration for receiving a signal/data from the external source, but also various additional configurations, such as a wireless communication module for wireless communication or a tuner, for selecting the broadcast signal in accordance with designs of the broadcast signal receiving apparatus 1. The communicator 110 may transmit information/data/signal from an image processing apparatus to the external device as well as receiving signal from the external device. That is, the communicator 110 is not limited to only the configuration for receiving a signal from the external device, but may be configured to interface for interactive communication. The communicator 110 may receive a control signal for selecting a user interface (UI) from a plurality of control devices. The communicator 110 may include a communication module for well-known short-range wireless communication such as Bluetooth, Infrared (IR), Ultra Wideband (UWB), Zigbee, etc., and may include a well-known communication port for wired communication. The communicator 110 may be utilized for various purposes, for example, transmitting and receiving a command for operation of the display, data, etc. as well as a control signal for selecting a UI.

The communicator 110 may communicate with a broadcast signal transmitting apparatus 10 to receive a broadcast signal of a channel selected among the plurality of channels.

According to an exemplary embodiment, the communicator 110 may communicate with a broadcast signal transmitting apparatus 10 that transmits broadcast signals of a variable channel group including at least one channel variably selected among a plurality of channels.

The storage 120 may be achieved by a non-volatile memory (i.e. a writable read only memory (ROM)) in which data remains even though the display apparatus 20 is turned off, and a user's changed matters are reflected. That is, the storage 120 may be provided as one or more among a flash memory, an erasable and programmable read only memory (EPROM) and an electrically erasable and programmable read only memory (EEPROM). The storage 120 may store the tuning information for selecting the channel of the broadcast signal as instructed by the controller 100.

According to an exemplary embodiment, the storage 120 may store tuning information about the broadcast signals of the variable channel group, transmitted from the broadcast signal transmitting apparatus 10.

If receiving the tuning information about at least one first channel among the plurality of channels from the transmitting apparatus 10, the controller 100 stores the received tuning information in the storage 120, controls the communicator 110 to receive the broadcast signal of the first channel based on the tuning information stored in the storage 120 in response to a user command for viewing the first channel, and controls the communicator 110 to make a request for the tuning information of the first channel to the transmitting apparatus 10 if the tuning information of the first channel is not stored in the storage 120.

According to an exemplary embodiment, the controller 100 may make a request for tuning information about a broadcast signal of at least one first channel, which is not matched between a first variable channel group currently transmitted from the broadcast signal transmitting apparatus 10 and a second variable channel group stored in the storage 120, to the broadcast signal transmitting apparatus 10.

According to an exemplary embodiment, the broadcast signal receiving apparatus 1 receives a broadcast signal from the broadcast signal transmitting apparatus 10 by a switched digital video (SDV) transmission method, and therefore a broadcast signal, of which channel is not fixed but variable depending on a user's request or a channel changed by the broadcast signal transmitting apparatus 10, is transmitted. The first variable channel group currently transmitted from the broadcast signal transmitting apparatus 10 may be different from the second variable channel group previously stored in the storage 120, and thus the controller 100 makes a request for the tuning information about a channel which is not matched between the first variable channel group and the second variable channel group, thereby quickly switching to a channel when a user selects the channel.

The controller 100 may receive the tuning information of the first channel from the broadcast signal transmitting apparatus 10 and store the tuning information in the storage 120. If a user issues a command to view the first channel, the controller 100 may control the communicator 110 to receive a broadcast signal of the first channel based on the tuning information of the first channel stored in the storage 120. Since the broadcast signal is received based on the previously stored tuning information when a user selects the first channel, there is an advantage that the channel is more quickly switched.

The first channel may include at least one of a previously-viewed channel and the last viewed channel. For example, if a user desires to select the previously-viewed channel again while viewing the TV, the broadcast signal of the previously-viewed channel can be immediately received based on the stored tuning information without requesting the tuning information again and displayed as an image since the tuning information about the previously-viewed channel is previously requested and stored even though the variable channel group transmitted from the broadcast signal transmitting apparatus 10 has been changed.

Alternatively, the first channel may include a preset favorite channel. For example, if channels frequently viewed by a user or channels registered as favorite channels by a user are different from channels of the variable channel group currently transmitted from the broadcast signal transmitting apparatus 10, the tuning information is requested and stored so that the channel can be quickly switched when a user select a channel again.

The controller 100 may make a request for the tuning information about the broadcast signal of the first channel to the broadcast signal transmitting apparatus 10 in accordance with at least one of a preset time and a preset period. For example, the controller 100 compares the currently received first variable channel group and the stored second variable channel group with each other at a preset time or in a preset period, and makes a request for the tuning information to the broadcast signal transmitting apparatus 10 if there is the first channel unmatched therebetween.

The controller 100 may make a request for the tuning information about the broadcast signal of the first channel to the broadcast signal transmitting apparatus 10 in accordance with a standby mode before viewing a channel. For example, if a TV is turned on but is in a standby or power-saving mode not displaying any image, the tuning information may be requested and stored with regard to a channel lastly viewed by a user or favorite channels. Thus, when the TV is awakened from the standby mode and enters a normal mode and a user selects the lastly-viewed channel or the favorite channel, the selected channel can be quickly displayed based on the stored tuning information without delay.

Alternatively, the controller 100 may make a request for the tuning information about the broadcast signal of the first channel to the broadcast signal transmitting apparatus in accordance with the normal mode where channels are viewable. For example, the controller 100 may previously store the tuning information requested with regard to the previously-viewed channels while a user watches TV, and quickly switch to the selected channel based on the stored tuning information if a user selects the previously-viewed channel again.

Alternatively, the controller 100 may make a request for the tuning information about the first channel to the broadcast signal transmitting apparatus 10, in accordance with connection with the broadcast signal transmitting apparatus 10. For example, if a user reboots a set-top box or turns on a TV, the controller 100 requests tuning information with regard to a channel lastly viewed by a user, a favorite channel, etc., and stores the tuning information, thereby quickly switching to a channel based on the stored tuning information when a user selects the channel.

The controller 100 may store tuning information about a merged channel, based on the tuning information about the broadcast signal of the variable channel group and the tuning information about the broadcast signal of a basic channel group including a plurality of channels always transmitted from the broadcast signal transmitting apparatus 10, in the storage 120. The tuning information about the merged channel may include an identifier for identifying the variable channel group and the basic channel group, and information about whether the variable channel group is transmitted. Thus, the tuning information about both the basic channel always transmitted from the broadcast signal transmitting apparatus 10 and the variable channel transmitted by the switched digital video (SDV) method is stored and managed, so that channel switching can be performed between the basic channel and the variable channel without an additional time delay.

FIG. 2 is a block diagram showing an example of the broadcast signal receiving apparatus 1 according to an exemplary embodiment. According to an exemplary embodiment, the broadcast signal receiving apparatus 1 may further include a tuner 130, an image processor 140, and a user input 150, in addition to the elements as shown in FIG. 1.

The tuner 130 may perform tuning for selecting and sorting the received broadcast signal in accordance with the channels.

There is no limit to the kinds of imaging process performed in the image processor 140. For example, the imaging process may include de-multiplexing for dividing a predetermined signal into signals corresponding to characteristics, decoding corresponding to a format of an image signal, de-interlacing for converting an interlaced type of an image signal into a progressive type, noise reduction for improving quality of an image, detail enhancement, frame refresh rate conversion, etc. Meanwhile, there may be provided a decoder for decoding a source image corresponding to a format of an encoded source image, and a frame buffer for storing frames of the decoded source image.

The image processor 140 may be achieved by a system-on-chip (SOC) where various functions are merged, or individual elements for independently performing processes, and may be mounted to a printed circuit board as an image processing board and embedded in the broadcast signal receiving apparatus 1.

The image processor 140 performs various preset imaging processes with respect to a broadcast signal including an image signal received from a receiver and a source image including an image signal received from an image source. The image processor 140 outputs the processed image signal to the display apparatus 20, so that the processed source image can be displayed on the broadcast signal receiving apparatus 1.

The user input 150 may transmit various preset control commands or information to the controller 100 in response to a user's control and input. The user input 150 may be achieved by a menu key or an input panel installed at the outside of the broadcast signal receiving apparatus 1, or a remote controller provided separately from the broadcast signal receiving apparatus 1. In addition, the user input 150 may be achieved by a touch screen. In the case of the touch screen, a user may touch an input menu displayed on the touch screen so that a preset command can be transmitted to the controller 100.

The user input 150 may receive a user's motion and voice. A user's motion may include a touch input. The user input 150 may directly receive a user's motion and voice, or may receive information about a user's motion and voice from an external device.

If receiving a user command for viewing at least one channel that belongs to the variable channel group, the controller 100 may search the tuning information of the at least one channel among the tuning information stored before a point in time of receiving the command.

The controller 100 periodically receives and stores the tuning information about at least one channel, which belongs to the variable channel group, from the transmitting apparatus 10, and updates the stored tuning information if the received tuning information is different from previously stored tuning information. For example, even if a user turns on the broadcast signal receiving apparatus 1 to receive and view at least one channel, which belongs to the variable channel group, through the display apparatus 20 and then turns off the broadcast signal receiving apparatus 1 to go out, the broadcast signal receiving apparatus 1 may receive, update and store the tuning information about the at least one channel, which belongs to the variable channel group, from the transmitting apparatus 10 periodically at a set period.

The controller 100 can more quickly display a channel in response to a request of a user who desires to view the channel, based on the tuning information about the channel, which belongs to the at least one channel of the variable channel group, received from the transmitting apparatus 10.

The controller 100 scans the tuning information about the basic channel group including a plurality of channels, always transmitted from the transmitting apparatus 10, and stores the tuning information about the merged channels in the storage 120, based on the tuning information about the scanned basic channel group and the tuning information about the variable channel group.

If a user issues a command to switch to a previously-viewed channel, the controller 100 determines whether the previously viewed channel is transmitted based on the stored tuning information and makes a request for the tuning information about the previously-viewed channel to the transmitting apparatus 10 if it is determined that the previously-viewed channel is not transmitted. For example, if a user wants to view the previously-viewed channel again while viewing another channel and thus issues a command for switching to the previously-viewed channel, the controller 100 searches the previously-viewed channel among the channels supplied from the broadcast signal transmitting apparatus 10, and requests and receives the tuning information of the previously-viewed channel if the previously-viewed channel is not being supplied. Further, the controller 100 processes the broadcast signal based on the tuning information of the received previously-viewed channel and transmits the processed signal to the display apparatus 20.

If a user reboots the broadcast signal receiving apparatus 1 and issues a command to view the lastly-viewed channel, but it is determined that the lastly viewed channel is not being supplied, the controller 100 may make a request for the tuning information of the lastly-viewed channel to the transmitting apparatus 10. For example, when the broadcast signal receiving apparatus 1 is turned off and turned on again, the controller 100 searches for the lastly-viewed channel among the channels currently being supplied from the broadcast signal transmitting apparatus 10, and requests and receives the tuning information of the lastly-viewed channel if the lastly-viewed channel is not being supplied. Further, the controller 100 processes the broadcast signal based on the tuning information of the received lastly-viewed channel and transmits the processed broadcast signal to the display apparatus 20.

The controller 100 may store the tuning information about the merged channels by comparing the tuning information of the received variable channel group with the tuning information of the basic channel group transmitted from the transmitting apparatus 10. For example, when there is a user's request for switching to one channel of the basic channel group, the controller 100 does not perform a search about whether the channel is transmitted from the broadcast signal transmitting apparatus 10 since the basic channel group is supplied, and immediately processes the broadcast signal based on the stored tuning information of the basic channel group with regard to the user's request for switching to the channel, thereby transmitting the processed broadcast signal to the display apparatus 20. On the other hand, when there is a user's request for switching to one channel of the variable channel group, the controller 100 determines whether the corresponding channel is transmitted from the broadcast signal transmitting apparatus 10 based on the updated tuning information because the channels of the variable channel group are variable. If the corresponding channel is not currently transmitted from the broadcast signal transmitting apparatus 10, the controller 100 makes a request for the tuning information about the corresponding channel to the transmitting apparatus 10. Using the tuning information of the corresponding channel received from the transmitting apparatus 10, the broadcast signal of the corresponding channel is processed in the image processor 140 and the processed broadcast signal is transmitted to the display apparatus 20.

Figure 3:
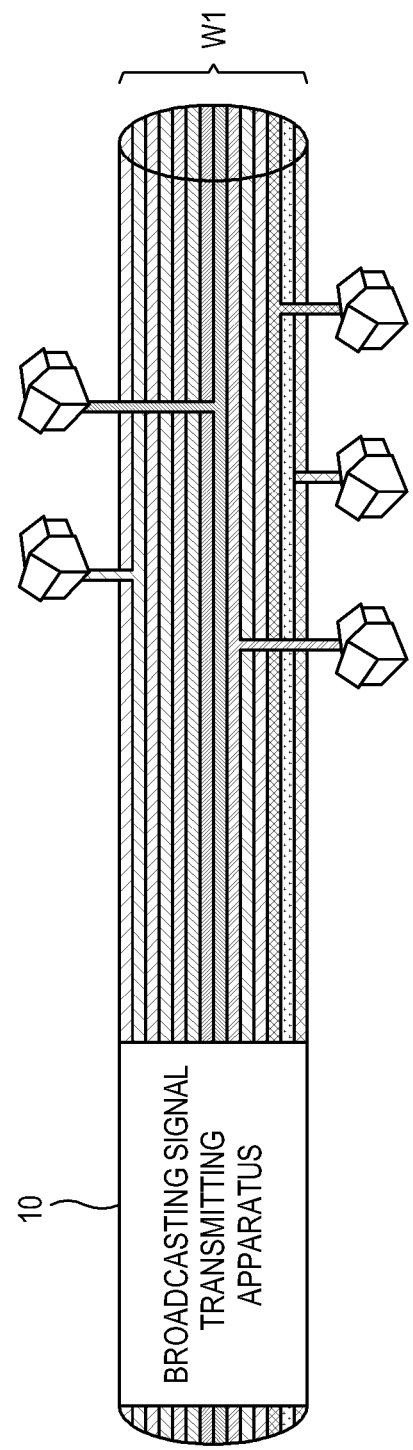
FIG. 3 shows an example of transmitting broadcast channels from the broadcast signal transmitting apparatus in a broadcasting manner.

FIG. 3 shows an example of transmitting the broadcast channels from the broadcast signal transmitting apparatus 10 in a broadcasting manner. FIG. 3 shows that a broadcast signal W1 encompassing all the channels is provided from the broadcast signal transmitting apparatus 10 by the broadcasting manner.

Figure 4:
FIG. 4 shows an example of explaining a method of transmitting broadcast channels of the broadcast signal in the broadcasting manner of FIG. 3.

FIG. 4 shows an example of explaining a method of transmitting broadcast channels CH01 to CH10 of the broadcast signal in the broadcasting manner of FIG. 3. As shown in FIG. 4, for example, the broadcast signal may include ten channels CH01 to CH10. In this case, the respective channels CH01 to CH10 occupy frequency bands exclusive to each other. Therefore, the frequency bandwidth W1 used by the broadcast signal becomes shorter as the number of channels CH01 to CH10 decreases, and becomes wider as the number of channels CH01 to CH10 increases.

In the broadcasting manner of FIG. 4, the broadcast signal transmitting apparatus 10 transmits a broadcast signal in such a manner that broadcasting data of all the broadcast channels CH01 to CH10 is embedded in the broadcast signal regardless of whether a user views the channels. However, there may be channels corresponding to a low viewer rating among the channels CH01 to CH10, or few broadcast channels CH01 to CH10 may be viewed in practice because the number of viewing users is small. Nevertheless, the broadcast signal in the broadcasting manner of FIG. 4 is transmitted including all the channels CH01 to CH10, and thus a problem arises in that a physical transmission bandwidth is wasted.

FIG. 4 shows only ten channels CH01 to CH10 as an example. However, if a growing trend of hundreds or thousands of channels in addition to CH01 to CH10 is taken into account, the foregoing manner may not only waste transmission bandwidth, but also limit number of additional channels. Thus, broadcasters employ a switched digital video (SDV) transmission manner in transmitting a broadcast signal, thereby preventing the bandwidth of the broadcast channels from being wasted.

Figure 5:
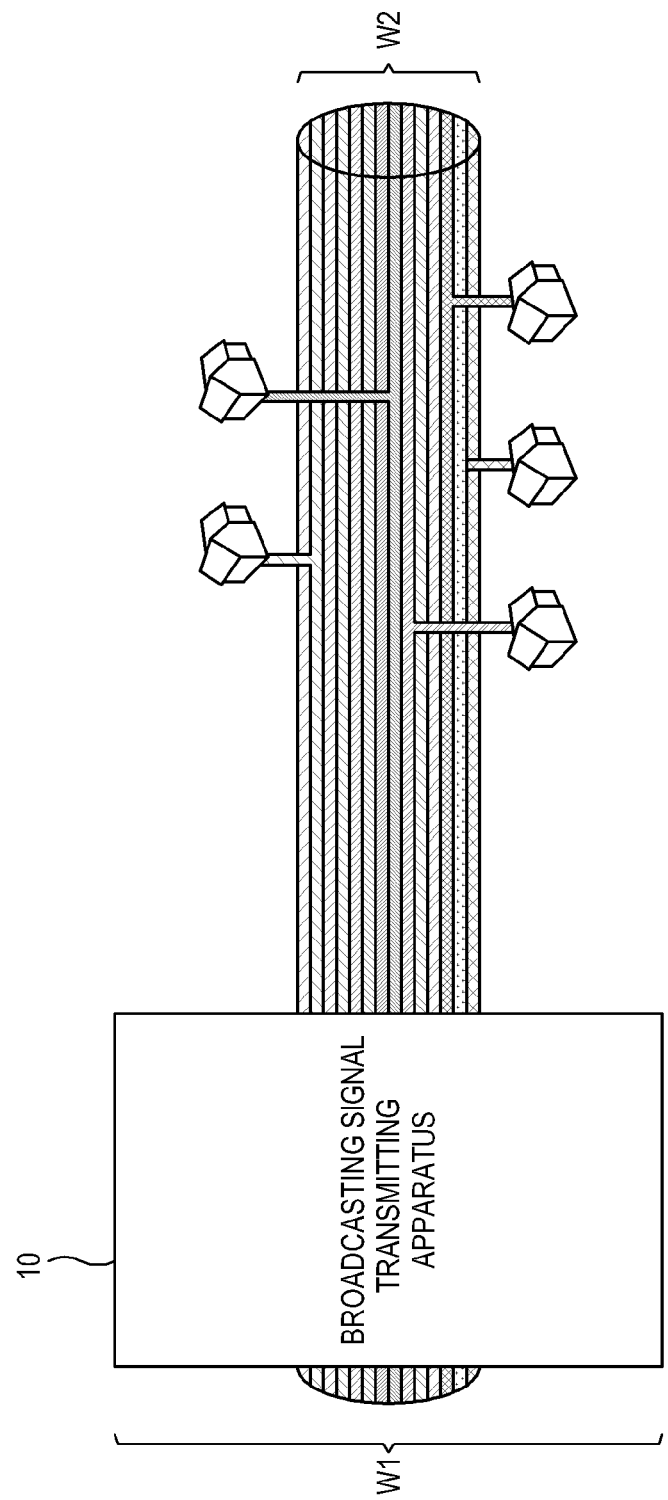
FIG. 5 shows an example of transmitting broadcast channels from a broadcast signal transmitting apparatus in a switched digital video (SDV) manner.

FIG. 5 shows an example of transmitting broadcast channels from the broadcast signal transmitting apparatus 10 by the SDV manner. FIG. 5 illustrates that the broadcast signals W2 of some channels among the broadcast signals W1 of all the channels capable of being provided by the broadcast signal transmitting apparatus 10 are transmitted by the SDV manner.

Figure 6:
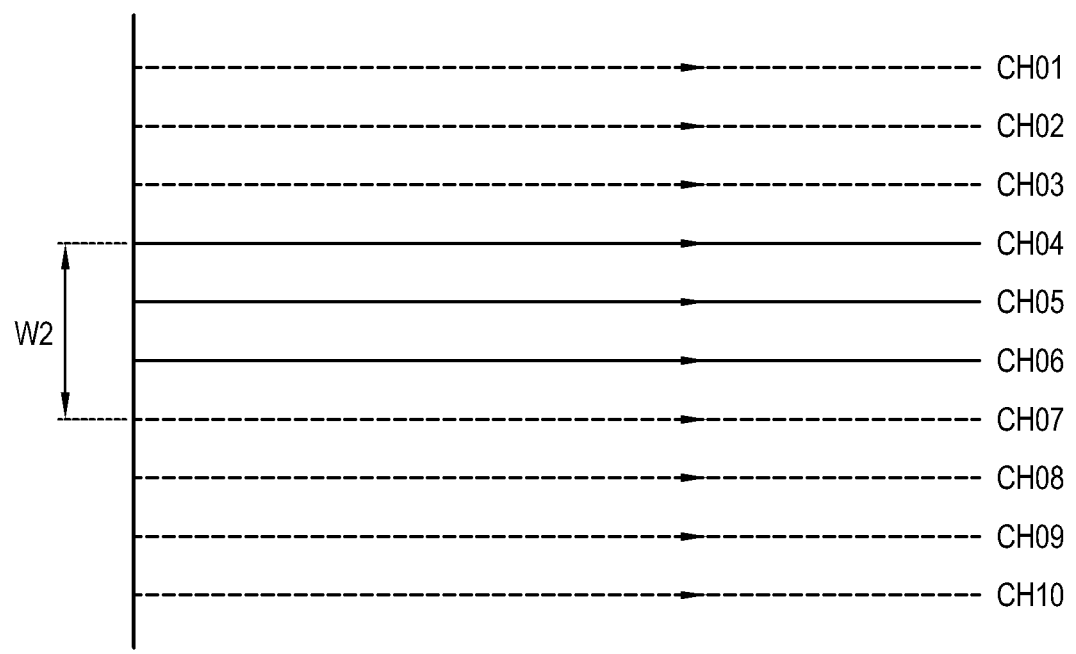
FIG. 6 shows an example of a method of transmitting broadcast channels of the broadcast signal in the SDV manner of FIG. 5.

FIG. 6 shows an example for explaining a method of transmitting the broadcast channels CH04 to CH06 of the broadcast signal in the SDV manner of FIG. 5.

As shown in FIG. 6, the broadcast signal is transmitted from the broadcast signal transmitting apparatus 10 to the broadcast signal receiving apparatus 1 in the SDV manner. If the broadcast signal includes ten channels CH01 to CH10, these channels CH01 to CH10 are divided into the basic viewing group CH04, CH05, and CH06 as channels always included in the broadcast signal, and the variable channel group CH01, CH02, CH03, CH07, CH08, CH09, and CH10 as channels selectively included in the broadcast signal in response to a user's request. In FIG. 6, the basic channel group CH04, CH05, and CH06 are represented by solid lines, and the variable channel group CH01, CH02, CH03, CH07, CH08, CH09, and CH10 are represented by dotted lines. Here, the names of the basic channel group and the variable channel group are just given for convenience in order to show the characteristic of each channel, and do not limit this exemplary embodiment.

Figure 7:
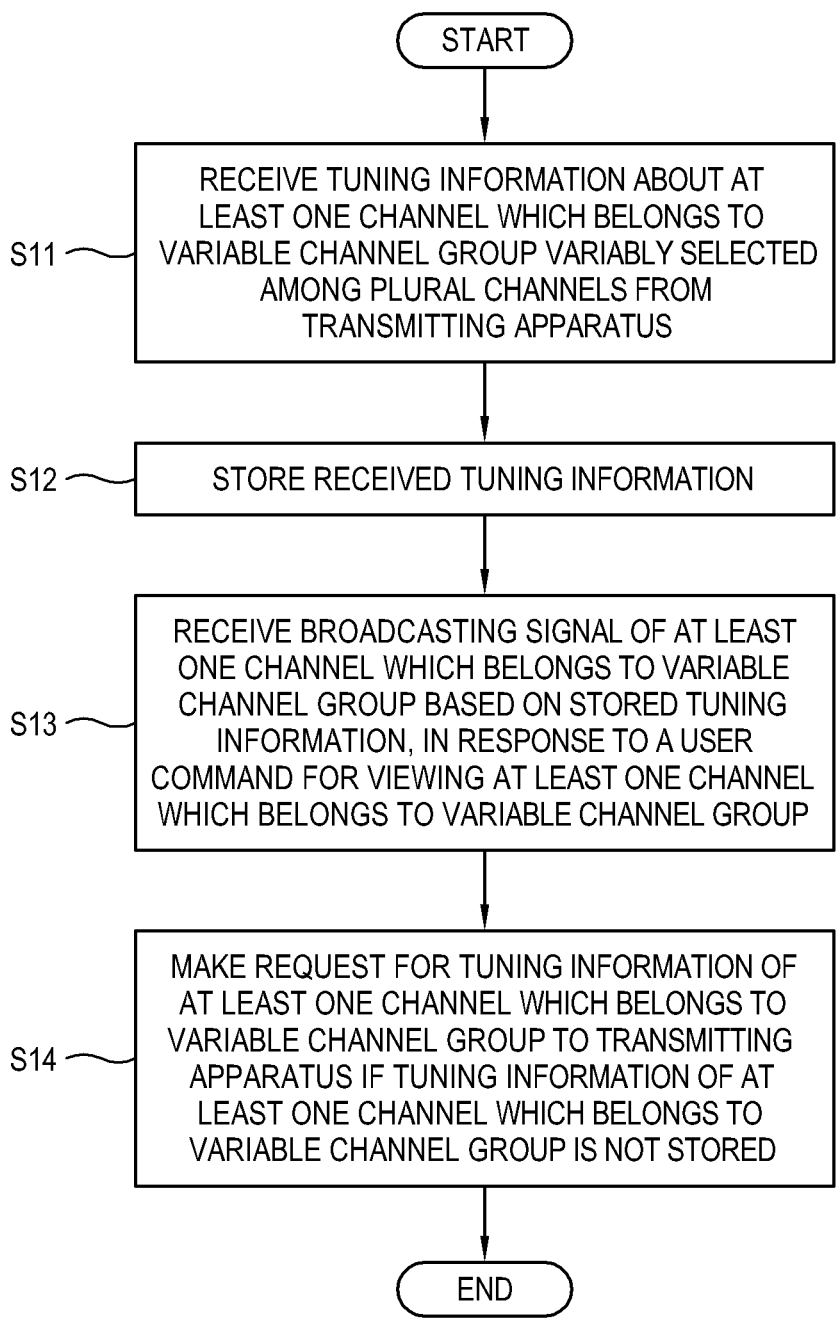
FIG. 7 is a flowchart showing a control method of the broadcast signal receiving apparatus according to an exemplary embodiment.

FIG. 7 is a flowchart showing a control method of the broadcast signal receiving apparatus according to an exemplary embodiment.

The tuning information about at least one channel which belongs to the variable channel group variably selected among the plurality of channels is received from the transmitting apparatus 10 (S11).

The received tuning information is stored (S12).

In response to a user command for viewing at least one channel which belongs to the variable channel group, the broadcast signal of the at least one channel which belongs to the variable channel group is received based on the stored tuning information (S13).

If the tuning information about the at least one channel which belongs to the variable channel group is not stored, a request for the tuning information about the at least one channel which belongs to the variable channel group is made to the transmitting apparatus 10 (S14).

Figure 8:
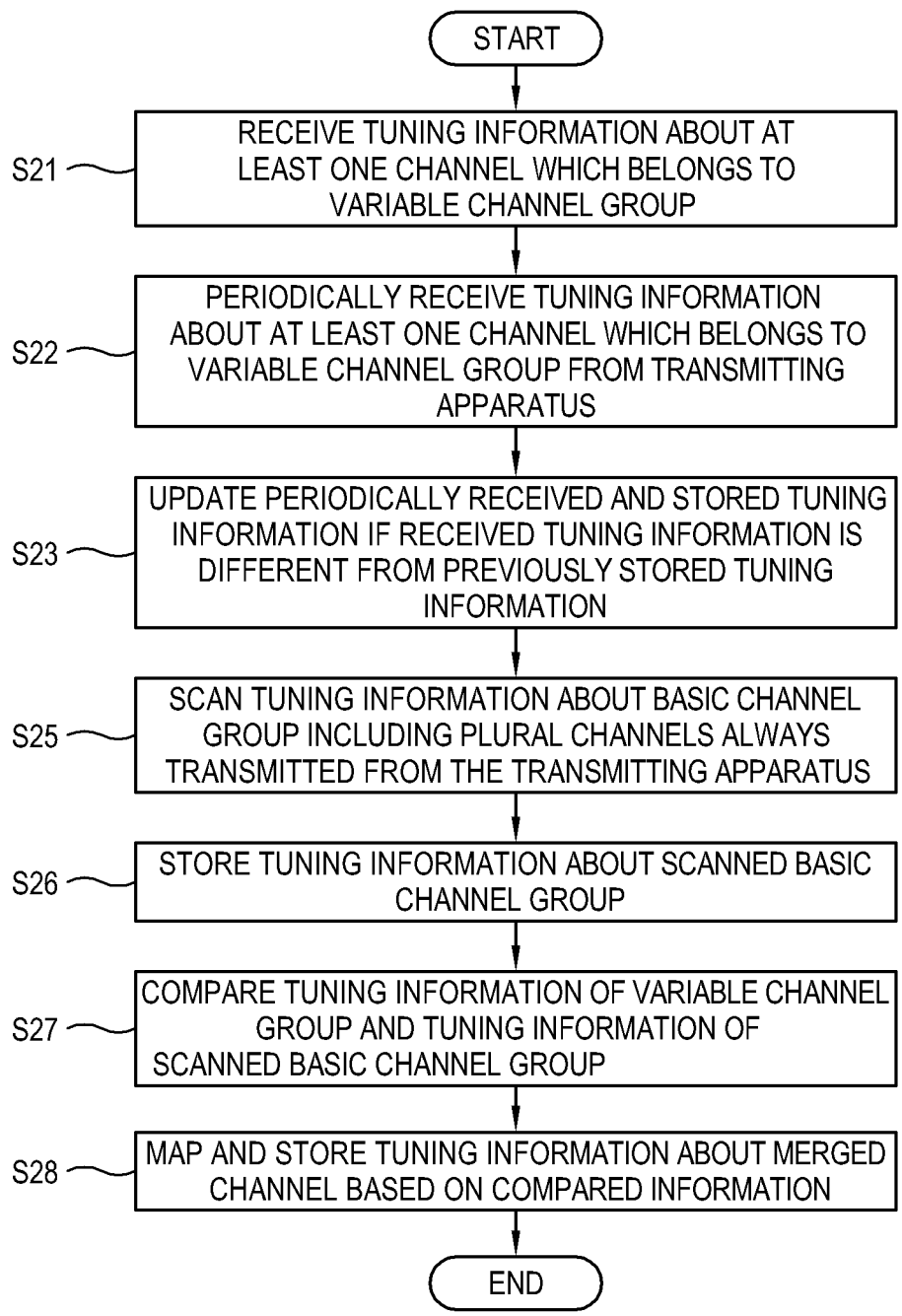
FIG. 8 is a flowchart of updating tuning information about channels in the broadcast signal receiving apparatus according to an exemplary embodiment.

FIG. 8 is a flowchart of updating tuning information about channels in the broadcast signal receiving apparatus 1 according to an exemplary embodiment.

Tuning information about at least one first channel among the plurality of channels is received from the transmitting apparatus 10 (S21).

The tuning information about the at least one channel which belongs to the variable channel group from the transmitting apparatus 10 is periodically received (S22).

If the received tuning information is different from the previously stored tuning information, the stored tuning information is updated with the received tuning information (S23).

Tuning information about the basic channel group including a plurality of channels always transmitted from the transmitting apparatus 10 is scanned (S25).

The tuning information about the scanned basic channel group is stored (S26).

The tuning information of the variable channel group and the tuning information of the scanned basic channel group are compared (S27).

The tuning information of the merged channels is mapped and stored based on the compared information (S28). The stored tuning information of the merged channels may be periodically updated by making a request for the tuning information of the variable channel group to the broadcast signal transmitting apparatus in accordance with variation in the variable channel group.

Figure 9:
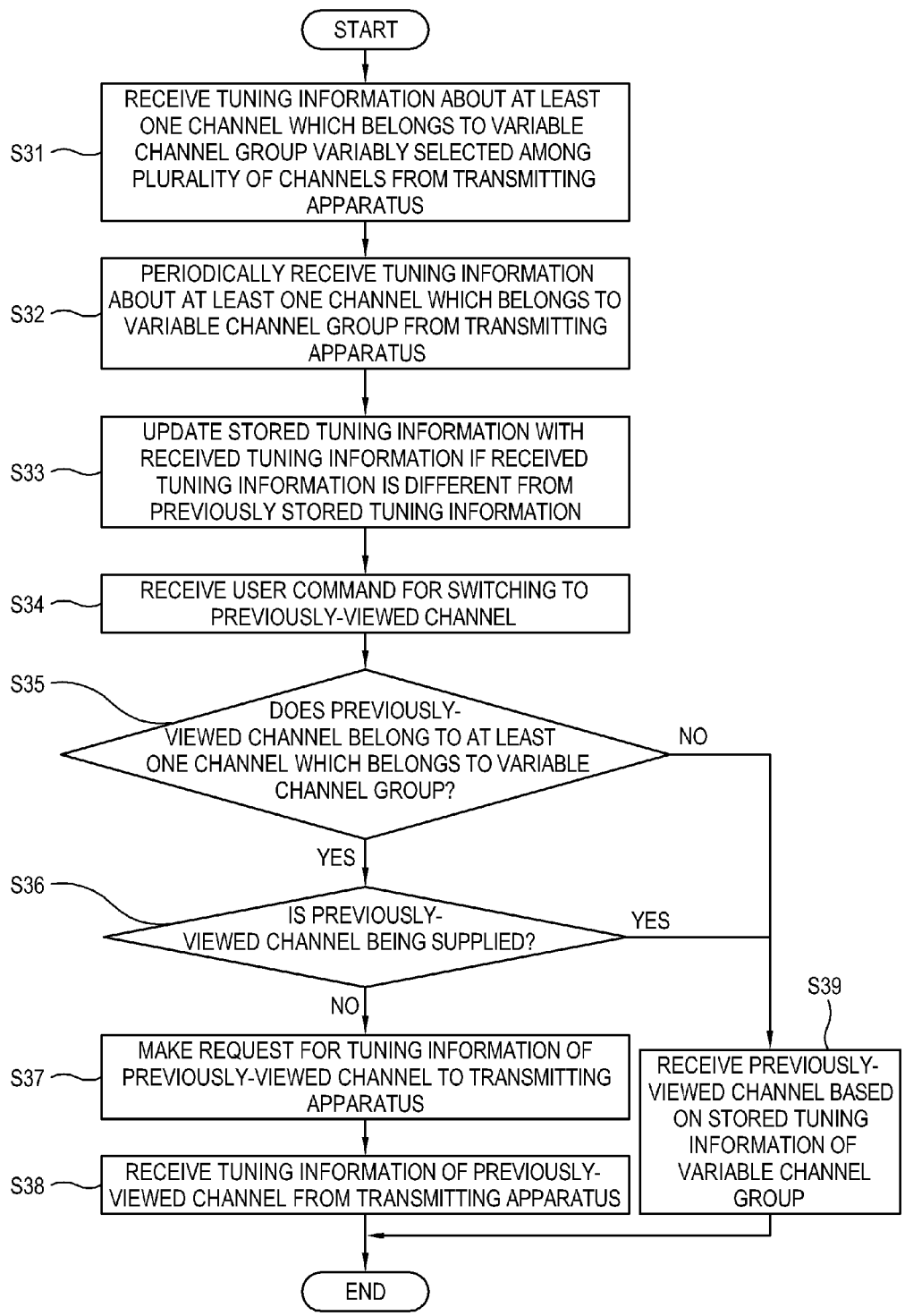
FIG. 9 is a flowchart showing a control method of the broadcast signal receiving apparatus, which is tuned to a previously-viewed channel, according to an exemplary embodiment.

FIG. 9 is a flowchart showing a control method of the broadcast signal receiving apparatus, which is tuned to a previously-viewed channel, according to an exemplary embodiment.

Tuning information about at least one channel, which belongs to a variable channel group, among the plurality of channels is received from the transmitting apparatus 10 (S31).

The tuning information about the at least one channel, which belongs to the variable channel group, is periodically received from the transmitting apparatus 10 (S32).

If the received tuning information is different from the previously stored tuning information, the stored tuning information is updated with the received tuning information (S33).

A user command for switching to the previously-viewed channel is received (S34).

It is determined whether the previously-viewed channel is among the at least one channel which belongs to the variable channel group (S35).

If it is determined in the operation S35 that the previously-viewed channel is among the at least one channel which belongs to the variable channel group, it is further determined whether the previously-viewed channel is being supplied (S36).

If it is determined that the previously-viewed channel is not being supplied, a request for the tuning information of the previously-viewed channel is made to the transmitting apparatus 10 (S37).

The tuning information of the previously-viewed channel is received from the transmitting apparatus 10 (S38). The broadcast signal is processed based on the received tuning information about the previously-viewed channel and then transmitted to the display apparatus 20.

If it is determined in the operation S35 that the previously-viewed channel is not among the at least one channel which belongs to the variable channel group, the previously-viewed channel is received based on the stored tuning information of the basic channel group in response to the user command.

If it is determined in the operation S36 that the previously-viewed channel is being supplied, the previously-viewed channel is received based on the stored tuning information of the variable channel group (S39). Further, the received broadcast signal of the previously-viewed channel is processed and transmitted to the display apparatus 20.

Figure 10:
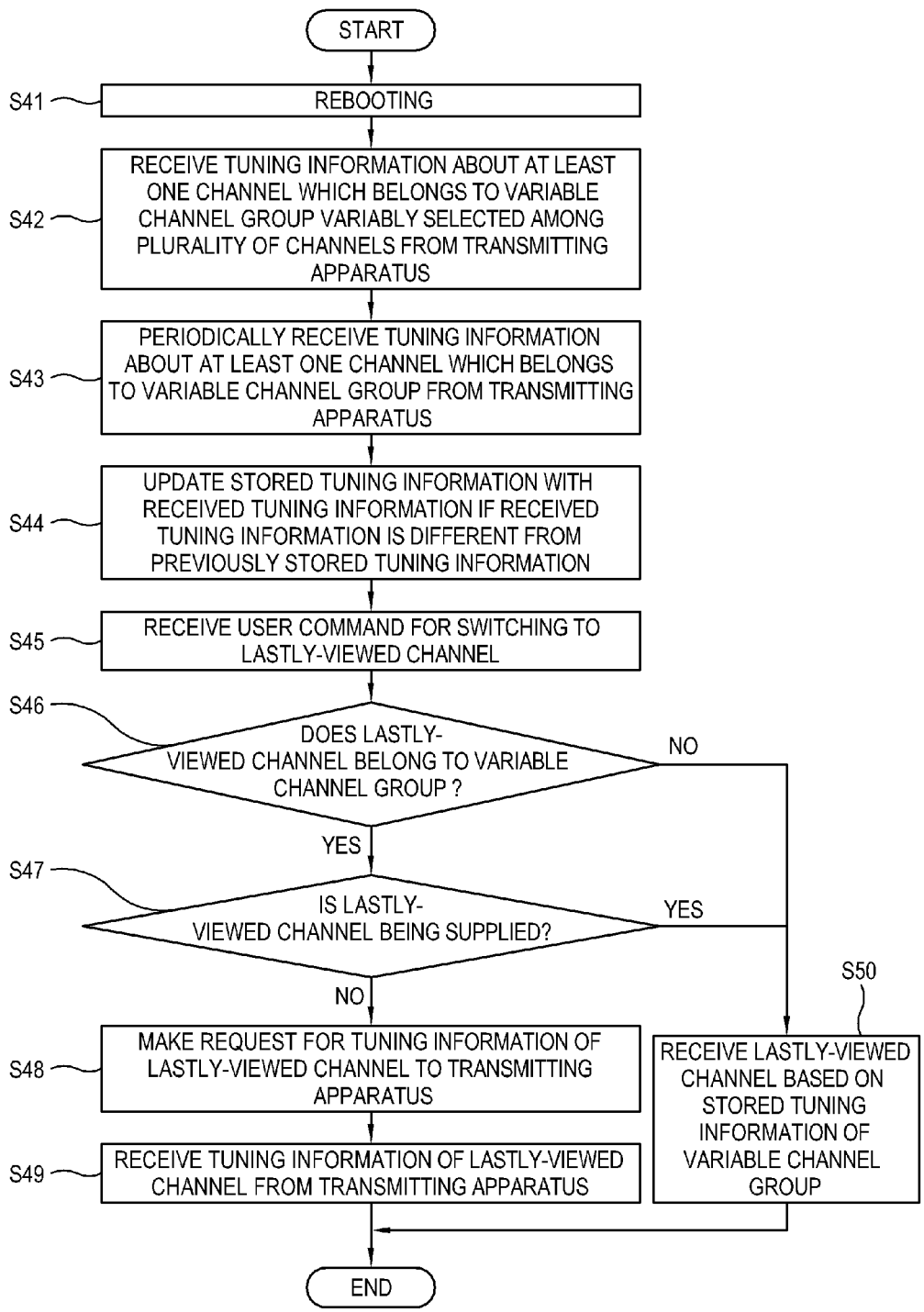
FIG. 10 is a flowchart showing a control method of the broadcast signal receiving apparatus, which is tuned to a lastly-viewed channel, according to an exemplary embodiment.

FIG. 10 is a flowchart showing a control method of the broadcast signal receiving apparatus, which is tuned to a lastly-viewed channel, according to an exemplary embodiment.

FIG. 10 shows a control flow for the lastly-viewed channel, and FIG. 9 shows a control flow for the previously-viewed channel. The embodiment of FIG. 9 about the previously-viewed channel illustrates that a user wants to view the previously-viewed channels including the lastly-viewed channel regardless of whether the broadcast signal receiving apparatus 1 is turned on/off. The lastly-viewed channel of FIG. 10 shows another exemplary embodiment when the broadcast signal receiving apparatus 1 is turned off and then rebooted up in the control flow of FIG. 9.

Thus, the control flow of FIG. 10 further includes a rebooting operation in addition to the control flow of FIG. 9. The method of controlling the broadcast signal receiving apparatus 1 for the lastly-viewed channel is similar to that of FIG. 9 for the previously-viewed channel, and thus repetitive descriptions thereof will be avoided.

FIG. 11 is a flowchart showing a control method of a broadcast signal receiving apparatus according to an exemplary embodiment.

Communication is performed with the broadcast signal transmitting apparatus 10 that transmits the broadcast signal of the variable channel group including at least one channel variably selected among a plurality of channels (S51).

The tuning information of the variable channel group received from the broadcast signal transmitting apparatus 10 is stored (S52).

The broadcast signal transmitting apparatus 10 receives a request to transmit the tuning information about the broadcast signal of at least one first channel not matched between a first variable channel group currently transmitted from the broadcast signal transmitting apparatus 10 and the stored second variable channel group (S53). The first channel may include at least one of a previously-viewed channel and a lastly-viewed channel. Alternatively, the first channel may include a preset favorite channel.

The operation S53 may include making a request for the tuning information about the broadcast signal of the first channel to the broadcast signal transmitting apparatus 10 in response to at least one of a preset time and a preset period.

According to an exemplary embodiment, there may be further provided an operation of making a request for the tuning information about the broadcast signal of the first channel to the broadcast signal transmitting apparatus 10 in accordance with a standby mode before viewing a channel. Alternatively, there may be further provided an operation of making a request for the tuning information about the broadcast signal of the first channel to the broadcast signal transmitting apparatus 10 in accordance with the normal mode where channels are viewable. Alternatively, there may be further provided an operation of making a request for the tuning information about the first channel to the broadcast signal transmitting apparatus 10, in accordance with connection with the broadcast signal transmitting apparatus 10.

The tuning information of the first channel from the broadcast signal transmitting apparatus 10 is received and stored (S54).

According to an exemplary embodiment, there may be further provided an operation of storing tuning information about a merged channel, based on the tuning information about the broadcast signal of the variable channel group and the tuning information about the broadcast signal of the basic channel group including a plurality of channels always transmitted from the broadcast signal transmitting apparatus 10. The tuning information about the merged channel may include an identifier for identifying the variable channel group and the basic channel group. Further, the tuning information about the merged channel may include information about whether the variable channel group is transmitted.

If a user issues a command for viewing the first channel, the broadcast signal of the first channel is received based on the stored tuning information of the first channel (S55).

The broadcast signal receiving apparatus 1 determines and updates the broadcast signal provided by the broadcast signal transmitting apparatus 10 and stores the channel map, thereby more quickly displaying the channel when a user selects the channel.

According to an exemplary embodiment, a channel desired by a user can be more quickly displayed when a broadcast signal transmitting apparatus provides a broadcast signal of a variable channel group variably selected from among a plurality of channels.

According to an exemplary embodiment, there may be further provided a broadcast signal transmitting apparatus. The broadcast signal transmitting apparatus may include a communicator that communicates with a broadcast signal receiving apparatus and a controller. The communicator may transmit a broadcast signal including a plurality of broadcast channels in the SDV manner. The communicator may transmit current tuning information that corresponds to variably transmitted broadcast channels current transmitted with the broadcast signal to the broadcast signal receiving apparatus. The communicator may transmit the current tuning information in accordance periodically or at preset times. The controller can control the overall operation of the broadcast signal transmitting apparatus and the communicator. The controller may control the communicator to transmit the current tuning information in response to a request from the broadcast signal receiving apparatus.

Although a few exemplary embodiments have been shown and described, it will be appreciated by those skilled in the art that changes may be made in these exemplary embodiments without departing from the principles and spirit of the invention. Therefore, the foregoing has to be considered as illustrative only. The scope of the invention is defined in the appended claims and their equivalents. Accordingly, all suitable modification and equivalents may fall within the scope of the invention.

What is claimed is:

1. A broadcast signal receiving apparatus comprising:
   a communication interface configured to communicate with a transmitting apparatus to receive a broadcast signal;
   a memory configured to store tuning information corresponding to each of a plurality of channels included in the broadcast signal; and
   a controller configured to:
      store first tuning information of a variable channel group included in the broadcast signal which is received from the transmitting apparatus, the variable channel group comprising at least one channel selected optionally from among the plurality of channels,
      in response to tuning information of at least one channel of the variable channel group included in a current broadcast signal being second tuning information different from the first tuning information, request the transmitting apparatus to provide the second tuning information of the at least one channel,
      receive the second tuning information corresponding to the at least one channel from the transmitting apparatus,
      update the tuning information stored in the memory based on the received second tuning information, and
      in response to receiving a command to view the at least one channel, receive a broadcast signal of the at least one channel based on the updated tuning information.

2. The broadcast signal receiving apparatus according to claim 1, wherein the at least one channel comprises at least one of a previously-viewed channel and a lastly-viewed channel.

3. The broadcast signal receiving apparatus according to claim 1, wherein the at least one channel comprises a preset favorite channel.

4. The broadcast signal receiving apparatus according to claim 1, wherein the controller is further configured to control the communication interface to transmit a request for the tuning information corresponding to the broadcast signal of the at least one channel to the transmitting apparatus in accordance with at least one of a preset time and a preset period.

5. The broadcast signal receiving apparatus according to claim 1, wherein the controller is further configured to control the communication interface to transmit a request for the tuning information corresponding to the broadcast signal of the at least one channel to the transmitting apparatus while the broadcast signal receiving apparatus is in a standby mode.

6. The broadcast signal receiving apparatus according to claim 1, wherein the controller is further configured to control the communication interface to transmit a request for the tuning information corresponding to the broadcast signal of the at least one channel to the transmitting apparatus during a normal mode of the broadcast signal receiving apparatus in which a channel is viewable.

7. The broadcast signal receiving apparatus according to claim 1, wherein the controller is further configured to control the communication interface to transmit a request for the tuning information corresponding to the broadcast signal of the at least one channel to the transmitting apparatus in accordance with a connection of the broadcast signal receiving apparatus with the transmitting apparatus.

8. The broadcast signal receiving apparatus according to claim 1, wherein the controller is further configured to store in the memory tuning information corresponding to a merged channel group, based on the first tuning information and the second tuning information of the variable channel group and third tuning information of a basic channel group of which channels do not belong to the variable group from among the plurality of channels.

9. The broadcast signal receiving apparatus according to claim 8, wherein the tuning information corresponding to the merged channel group comprises an identifier for identifying the variable channel group and the basic channel group.

10. The broadcast signal receiving apparatus according to claim 8, wherein the tuning information corresponding to the merged channel group comprises information about indicating the variable channel group is transmitted.

11. A broadcast signal receiving apparatus comprising:
a transceiver configured to communicate with a broadcast signal transmitting apparatus, the broadcast signal transmitting apparatus being configured to transmit a broadcast signal comprising a plurality of broadcast channels, one or more broadcast channels among the plurality of broadcast channels being variably transmitted broadcast channels from among a plurality of broadcast channels of a variable channel group;
a memory configured to store tuning information corresponding to the one or more broadcast channels; and
a controller configured to:
store first tuning information of the variable channel group included in the broadcast signal which is received from the broadcast signal transmitting apparatus, the variable channel group comprising at least one channel selected optionally from among the plurality of broadcast channels,
in response to tuning information of at least one channel of the variable channel group included in a current broadcast signal being a second tuning information different from the first tuning information,
request that the broadcast signal transmitting apparatus provide the second tuning information corresponding to the at least one channel,
update the tuning information stored in the memory based on the second tuning information, and
control the transceiver to receive the broadcast signal based on the updated tuning information.

12. The broadcast signal receiving apparatus according to claim 11, wherein the controller is further configured to control the transceiver to request the tuning information corresponding to the at least one channel in accordance with at least one of a preset time and a preset period.

* * * * *